(12) United States Patent
Yamada et al.

(10) Patent No.: US 10,190,730 B2
(45) Date of Patent: Jan. 29, 2019

(54) LIGHT FLUX CONTROLLING MEMBER, LIGHT EMITTING DEVICE AND ILLUMINATING DEVICE

(71) Applicant: Enplas Corporation, Saitama (JP)

(72) Inventors: Kyouhei Yamada, Saitama (JP); Akinobu Seki, Saitama (JP); Masayo Takizawa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/572,275

(22) PCT Filed: Apr. 21, 2016

(86) PCT No.: PCT/JP2016/062666
§ 371 (c)(1),
(2) Date: Nov. 7, 2017

(87) PCT Pub. No.: WO2016/181789
PCT Pub. Date: Nov. 17, 2016

(65) Prior Publication Data
US 2018/0128430 A1    May 10, 2018

(30) Foreign Application Priority Data

May 8, 2015 (JP) ................................ 2015-095643
Nov. 4, 2015 (JP) ................................ 2015-216880

(51) Int. Cl.
*F21K 9/237* (2016.01)
*F21K 9/232* (2016.01)
(Continued)

(52) U.S. Cl.
CPC .............. *F21K 9/237* (2016.08); *F21K 9/232* (2016.08); *F21K 9/235* (2016.08); *F21K 9/69* (2016.08);
(Continued)

(58) Field of Classification Search
CPC .......... F21K 9/232; F21K 9/235; F21K 9/237; F21V 3/00
See application file for complete search history.

(56) References Cited

U.S. PATENT DOCUMENTS 9,671,087 B2 * 6/2017 Nakamura ................ F21V 3/02
2016/0298826 A1 * 10/2016 Lim ....................... F21V 7/0091

FOREIGN PATENT DOCUMENTS

| JP | 2003-258319 A | 9/2003 |
| JP | 2012-243396 A | 12/2012 |

(Continued)

OTHER PUBLICATIONS

International Search Report from International Application No. PCT/JP2016/062666 dated Aug. 2, 2016.

*Primary Examiner* — Thomas M Sember
(74) *Attorney, Agent, or Firm* — Brundidge & Stanger, P.C.

(57) ABSTRACT

A light beam control member according to the present invention comprises: an incidence surface including a first incidence surface arranged spaced apart from a center axis, and a second incidence surface arranged by surrounding the first incidence surface; an upper total reflection surface arranged opposite the incidence surface, and causing the light incident on the incidence surface to reflect in a direction away from the center axis; a lower total reflection surface arranged between the center axis and the first incidence surface and surrounding the center axis, and causing part of the light incident on the first incidence surface to reflect toward the upper total reflection surface; and an emission surface arranged outside the upper total reflection surface and surrounding the center axis, and causing the light reflected from the upper total reflection surface to be emitted to the outside.

6 Claims, 11 Drawing Sheets

(51) Int. Cl.
  *F21K 9/235*  (2016.01)
  *F21V 3/00*  (2015.01)
  *F21V 5/04*  (2006.01)
  *F21K 9/69*  (2016.01)
  *F21Y 115/10*  (2016.01)
  *F21V 3/04*  (2018.01)
  *F21Y 103/33*  (2016.01)

(52) U.S. Cl.
  CPC ................ *F21V 3/00* (2013.01); *F21V 5/045* (2013.01); *F21V 5/046* (2013.01); *F21V 3/049* (2013.01); *F21Y 2103/33* (2016.08); *F21Y 2115/10* (2016.08)

(56) References Cited

FOREIGN PATENT DOCUMENTS

| JP | 2012-252994 A | 12/2012 |
| JP | 2013-084346 A | 5/2013 |

\* cited by examiner

LIGHT FLUX CONTROLLING MEMBER, LIGHT EMITTING DEVICE AND ILLUMINATING DEVICE

TECHNICAL FIELD

The present invention relates to a light flux controlling member that controls a distribution of light emitted from a light emitting element, and a light emitting device and an illumination apparatus including the light flux controlling member.

BACKGROUND ART

In recent years, in view of energy saving and environmental conservation, illumination apparatuses (such as light-emitting diode lamps) using a light-emitting diode (hereinafter also referred to as "LED") as a light source have been increasingly used in place of incandescent lamps. Conventional illumination apparatuses using LEDs as the light source, however, emit light only in the forward direction, and cannot emit light in a wide range unlike incandescent lamps. Therefore, unlike incandescent lamps, the conventional illumination apparatuses cannot illuminate a room over a wide range by utilizing the reflection light of the ceiling and walls.

To make the light distribution characteristics of the conventional illumination apparatuses using LEDs as the light source close to the light distribution characteristics of incandescent lamps, it has been proposed to control the light distribution of light emitted from LEDs by a light flux controlling member (see, for example, PTL 1). FIG. 1 is a schematic view illustrating a configuration of illumination apparatus 10 disclosed in PTL 1. As illustrated in FIG. 1, illumination apparatus 10 includes a plurality of LEDs 12 disposed on a substrate, and cylindrical case 14 made of a light transmissive material disposed around LEDs 12. The top surface of case 14 is formed in an inverted truncated cone shape. Aluminum plate (light flux controlling member) 16 that reflects light is bonded on the tilted surface of the truncated cone, and the tilted surface functions as a reflecting surface. On the other hand, the planar surface of the truncated cone shape functions as transmission window 18 through which light passes. As indicated by an arrow in FIG. 1, part of light emitted from LED 12 disposed at the center passes through transmission window 18 and becomes emission light in the forward (upward) direction. In addition, part of light emitted from LEDs 12 is reflected by aluminum plate 16 and becomes emission light in the lateral direction (horizontal direction) and the rearward direction (lower direction).

By controlling the travelling direction of the light emitted from the LED disposed at the center with use of a light flux controlling member, it is possible to obtain not only emission light in the forward direction but also emission light in the lateral direction and the rearward direction. Accordingly, by use of the light flux controlling member (aluminum plate) disclosed in PTL 1, it is possible to make the light distribution characteristics of an illumination apparatus (LED lamp) close to the light distribution characteristics of incandescent lamps to a certain degree.

CITATION LIST

Patent Literature

PTL 1
Japanese Patent Application Laid-Open No. 2003-258319

SUMMARY OF INVENTION

Technical Problem

Illumination apparatus 10 disclosed in PTL 1 is, however, configured to control the light emitted from LED 12 disposed at the center, and therefore cannot appropriately control the light emitted from LED 12 disposed at portions other than the center. Likewise, in the case where LED 12 having a large light emitting surface is used, the light emitted from the outer periphery part of the light emitting surface cannot be appropriately controlled. As a result, in such cases, the balance of the light distribution characteristics of illumination apparatus 10 disclosed in PTL 1 is disadvantageously poor.

In view of this, an object of the present invention is to provide a light flux controlling member which is used for an illumination apparatus including a light emitting element, and can distribute the light in the forward direction, the lateral direction and the rearward direction with a good balance even in the case where a plurality of light emitting elements are disposed, or a light emitting element having a large light emitting surface is used. In addition, another object of the present invention is to provide a light emitting device and an illumination apparatus having the light flux controlling member.

Solution to Problem

A light flux controlling member according to an embodiment of the present invention controls a distribution of light emitted from a light emitting element, the light flux controlling member including: an incidence surface including a first incidence surface that is disposed separately from a central axis of the light flux controlling member to surround the central axis, and a second incidence surface that is disposed to surround the first incidence surface, the incidence surface being configured to allow light emitted from the light emitting element to enter the light flux controlling member; an upper total reflection surface disposed on a side opposite to the incidence surface such that a distance from the central axis gradually increases along the central axis toward an upper side, the upper total reflection surface being configured to reflect, in a direction away from the central axis, a part of light incident on the incidence surface; a lower total reflection surface disposed between the central axis and the first incidence surface to surround the central axis, and configured to reflect, toward the upper total reflection surface, a part of light incident on the first incidence surface; and an emission surface disposed outside relative to the upper total reflection surface to surround the central axis, and configured to mainly emit, to outside, light reflected by the upper total reflection surface. The incidence surface, the upper total reflection surface, the lower total reflection surface and the emission surface are rotationally symmetrical about the central axis as a rotation axis.

A light emitting device according to an embodiment of the present invention includes: one or more light emitting elements; and the light flux controlling member. The light flux controlling member is disposed such that a central axis of the light flux controlling member coincides with an optical axis of the one or more light emitting elements, and a light emitting surface of the one or more light emitting elements is disposed to face the second incidence surface at a position most separated from the central axis.

An illumination apparatus according to an embodiment of the present invention includes: the light emitting device; and a cover that allows light emitted from the light emitting device to pass therethrough while diffusing the light.

Advantageous Effects of Invention

An illumination apparatus having the light flux controlling member of the embodiments of the present invention has light distribution characteristics close to the light distribution characteristics of incandescent lamps in comparison with conventional illumination apparatuses.

DESCRIPTION OF EMBODIMENTS

Embodiments of the present invention are described below in detail with reference to the accompanying drawings. The following description explains an illumination apparatus which can be used in place of incandescent lamps, as a typical example of the illumination apparatus of the embodiments of the present invention.

Embodiment 1

(Configuration of Illumination Apparatus)

Figure 1:
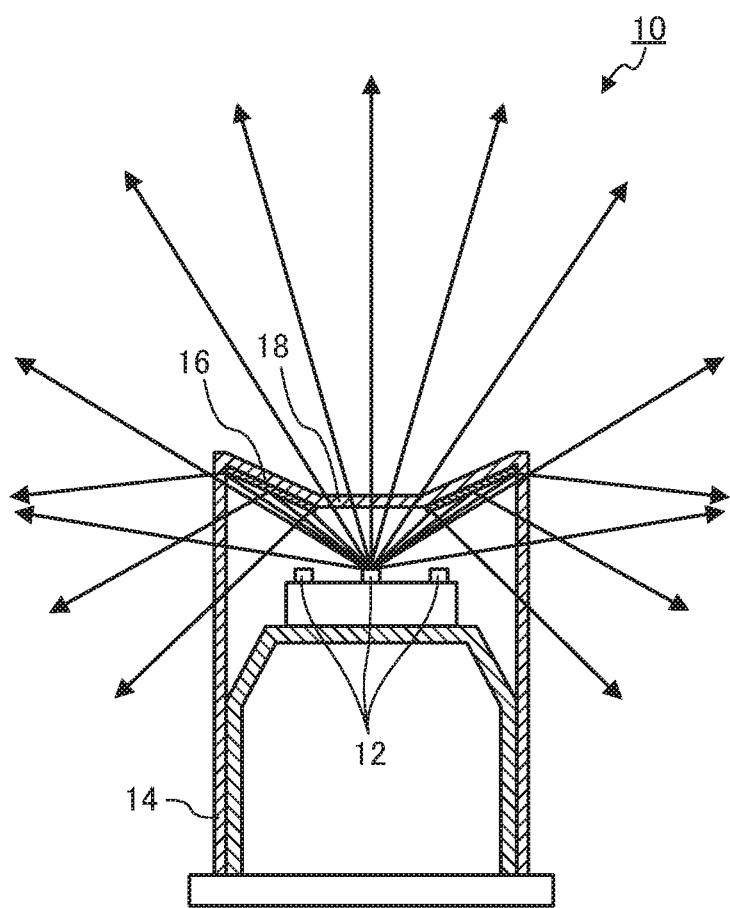
FIG. 1 is a schematic view illustrating a configuration of an illumination apparatus disclosed in PTL 1.
Figure 2:
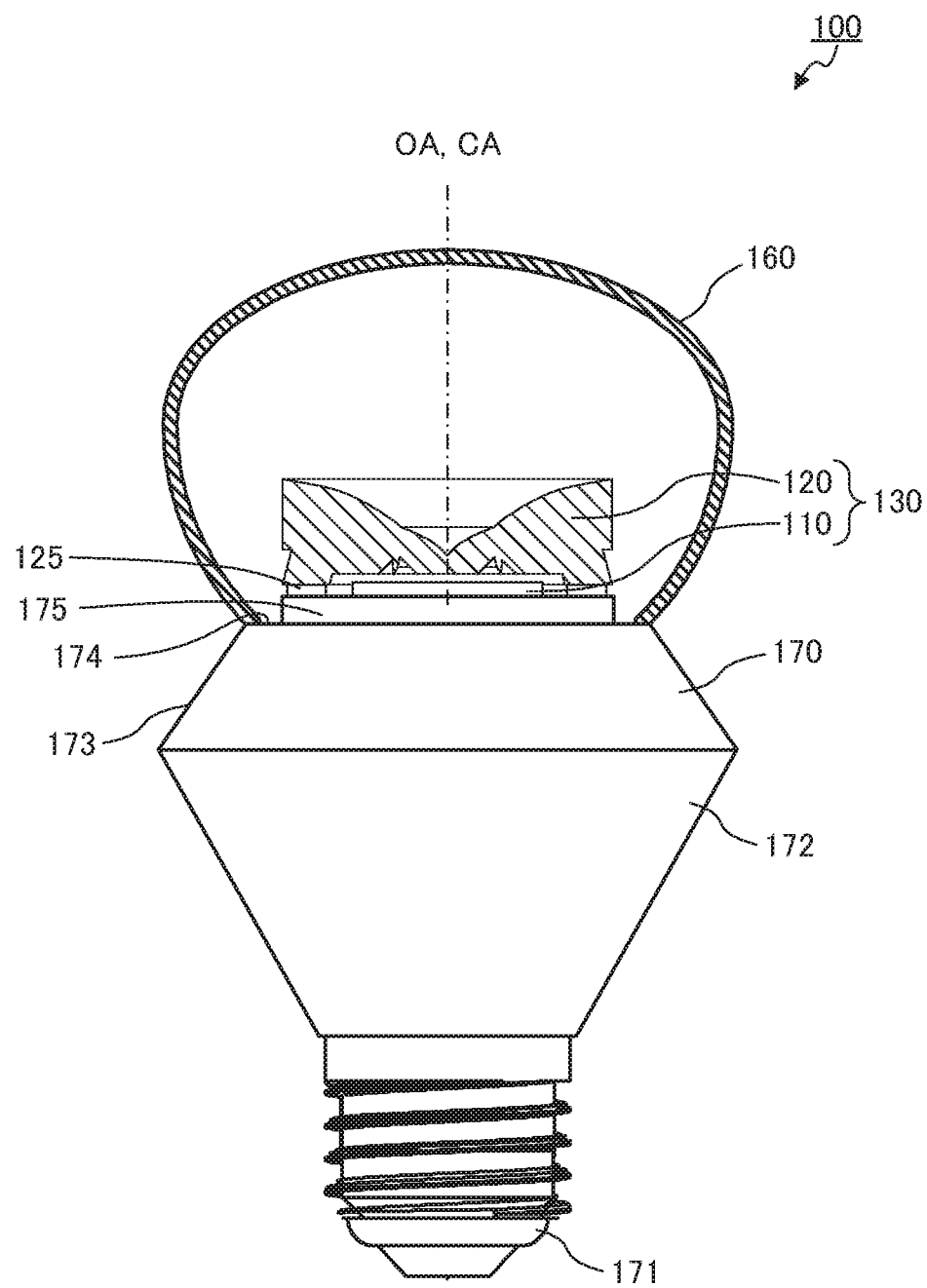
FIG. 2 is a partial sectional view of an illumination apparatus according to Embodiment 1.

FIG. 2 is a sectional view illustrating a configuration of illumination apparatus 100 of Embodiment 1 of the present invention. It is to be noted that, in FIG. 2, only light emitting device 130 and cover 160 are illustrated in cross-section. As illustrated in FIG. 2, illumination apparatus 100 includes light emitting device 130 including light emitting element 110 and light flux controlling member 120, cover 160 and housing 170. Each component is described below.

Light emitting elements 110 is a light source of illumination apparatus 100, and is mounted in housing 170. For example, light emitting element 110 is a light-emitting diode (LED) such as a white light-emitting diode. One light emitting element 110 or a plurality of light emitting elements 110 may be provided. In addition, the size of the light emitting surface of light emitting element 110 is not limited. In the present embodiment, the number of light emitting element 110 is one, and light emitting element 110 is larger than third incidence surface 131 and first incidence surface 132 of light flux controlling member 120 described later. In addition, the light emitting surface (light emitting point) of light emitting element 110 at the position most separated from central axis CA faces second incidence surface 133 described later. Light emitting element 110 is disposed such that its optical axis OA coincides with central axis CA of light flux controlling member 120. Here, the "optical axis of light emitting element" as used herein means the light travelling direction at the center of a stereoscopic light flux from light emitting element 110. In the case where a plurality of light emitting elements 110 are provided, the "optical axis of light emitting element" means the light travelling direction at the center of a stereoscopic light flux from light emitting elements 100. In the following description, the emission direction along optical axis OA of light emitting element 110 is the forward direction, and the direction opposite to the forward direction is the rearward direction.

Light flux controlling member 120 controls the distribution of the light emitted from light emitting element 110. Light flux controlling member 120 is disposed to housing 170 such that central axis CA of light flux controlling member 120 coincides with optical axis OA of light emitting element 110. One of the features of the present invention is the shape of light flux controlling member 120, and therefore the details of light flux controlling member 120 are described later.

Cover 160 includes a hollow region including an opening. Light emitting device 130 is disposed in the hollow region of cover 160.

Cover 160 covers light flux controlling member 120, and allows light emitted from light flux controlling member 120 to pass therethrough while diffusing the light. Cover 160 has a light transmitting property. Examples of the material of cover 160 include light transmissive resins such as polymethylmethacrylate (PMMA), polycarbonate (PC), and epoxy resin (EP); and glass. Cover 160 has a light diffusing property. The way of giving the light diffusion function to cover 160 is not limited. For example, a light diffusion process (for example, roughening process) may be performed on the inner surface or the outer surface of cover 160 produced with a transparent material, or a light diffusing material containing a scattering member such as beads may be added to the above-mentioned transparent material to produce cover 160.

Cover 160 preferably has a shape which is rotationally symmetrical about optical axis OA. Cover 160 may have a shape which is composed only of a shape rotationally symmetrical shape, or a shape which includes a part of a rotationally symmetrical shape, for example. Preferably, cover 160 has a shape which can further improve the balance of the light distribution of light emitted from light flux controlling member 120. For example, preferably, cover 160 has a shape in which the diameter of the opening of cover 160 is smaller than the maximum outer diameter of cover 160 from the viewpoint of increasing the quantity of the light toward the rearward direction. For example, the shape of cover 160 may be a spherical cap shape (a shape obtained by cutting out a part of a sphere along a plane). The maximum outer diameter of cover 160 is, for example, 60 mm, and the opening diameter of cover 160 is, for example, 38 mm (see FIG. 2).

Housing 170 supports light emitting element 110, light flux controlling member 120 and cover 160 at the front end portion of housing 170. Housing 170 is a rotationally symmetrical member about optical axis OA as the rotation axis. Housing 170 includes base 171, first tapered surface 172 that is disposed on the front side of base 171 such that its distance from central axis CA gradually increases toward the front side, second tapered surface 173 whose distance from central axis CA gradually decreases from the front end edge of first tapered surface 172 toward the front side, annular end surface 174 that is formed on the inside from the front end edge of second tapered surface 173 and is composed of an annular plane perpendicular to central axis CA, and columnar protruding part 175 that protrudes forward from the inner peripheral edge of annular end surface 174.

A substrate (not illustrated) is attached on the circular front end surface of protruding part 175, and light emitting element 110 is mounted on the substrate. The distance between annular end surface 174 and the front end surface of protruding part 175 (protruding length of protruding part 175) is 3 mm, for example. Annular end surface 174 is in contact with the opening of cover 160. The outer diameter of annular end surface 174 is substantially equal to the outer diameter of the opening of cover 160. Annular end surface 174 is a seat that makes contact with the opening of cover 160. Second tapered surface 173 is a tapered surface whose distance from central axis CA gradually increases toward the rear side from the periphery of the seat.

In a portion surrounded by first tapered surface 172 and second tapered surface 173 of housing 170, a power supply circuit not illustrated in the drawing that electrically connects base 171 and light emitting element 110 is arranged. In addition, housing 170 serves also as a heat sink for emitting the heat of light emitting element 110. In view of this, housing 170 is preferably composed of a metal having high thermal conductivity such as aluminum and copper.

The light emitted from light emitting element 110 is controlled by light flux controlling member 120 such that the light travels toward all directions. The light emitted from light flux controlling member 120 passes through cover 160 while being diffused.

(Configuration of Light Flux Controlling Member)

Figure 3A:
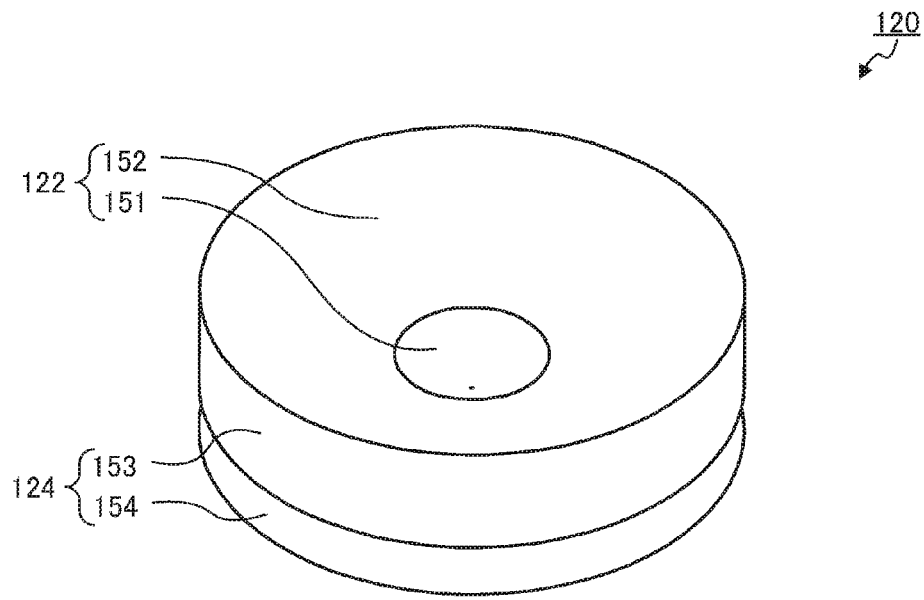
FIG. 3A and FIG. 3B are perspective views of a light flux controlling member according to Embodiment 1.
Figure 3B:
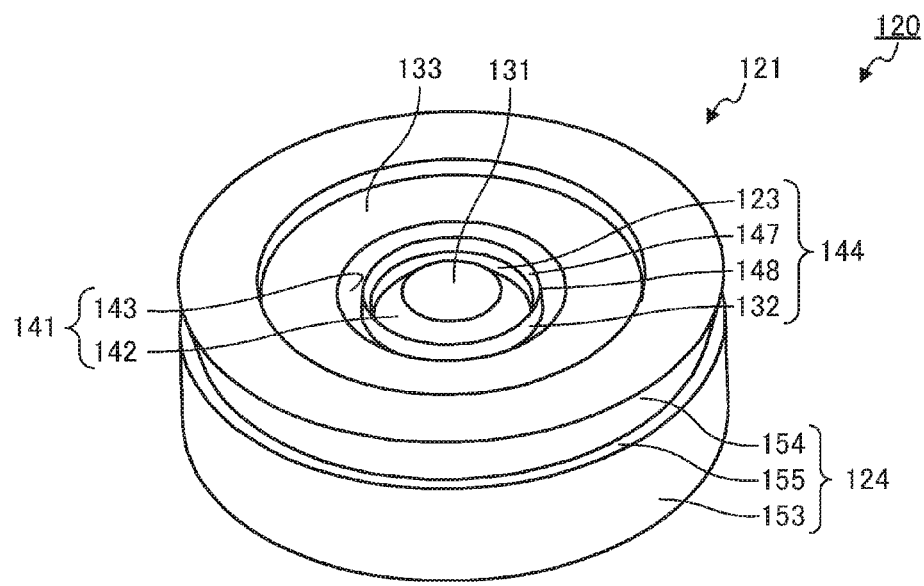
Figure 4A:
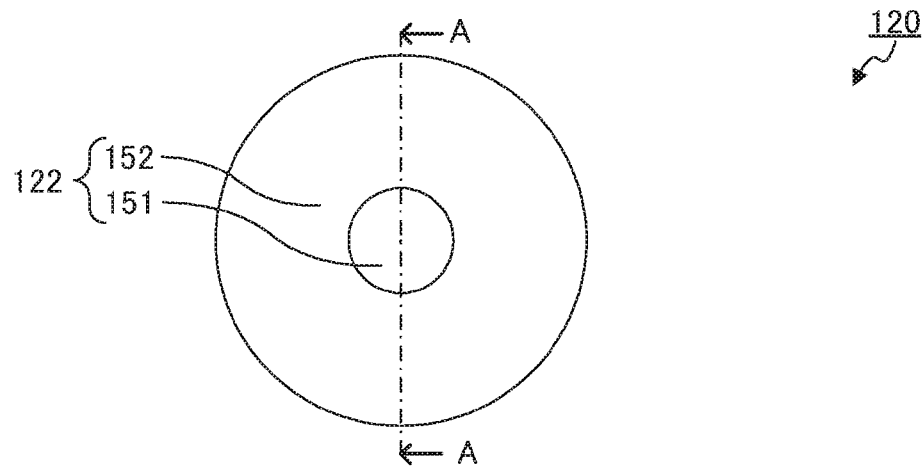
FIG. 4A to FIG. 4C illustrate a configuration of the light flux controlling member according to Embodiment 1.
Figure 4B:
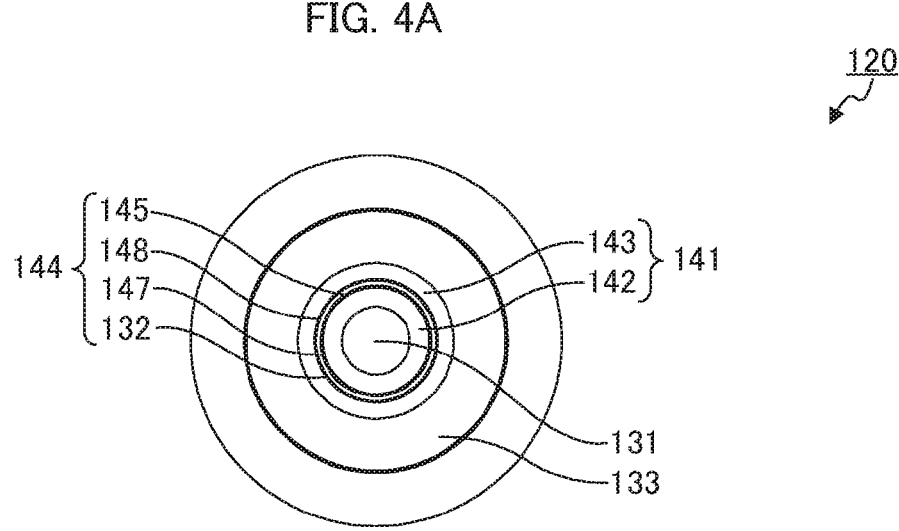
Figure 4C:
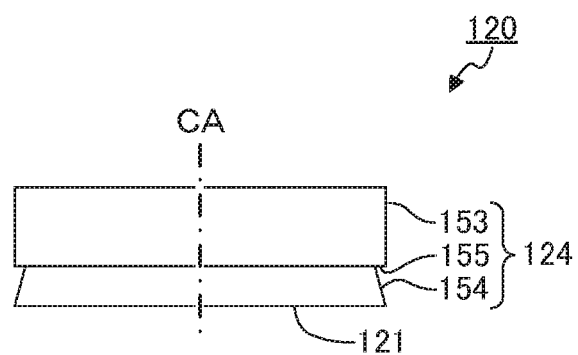
Figure 5A:
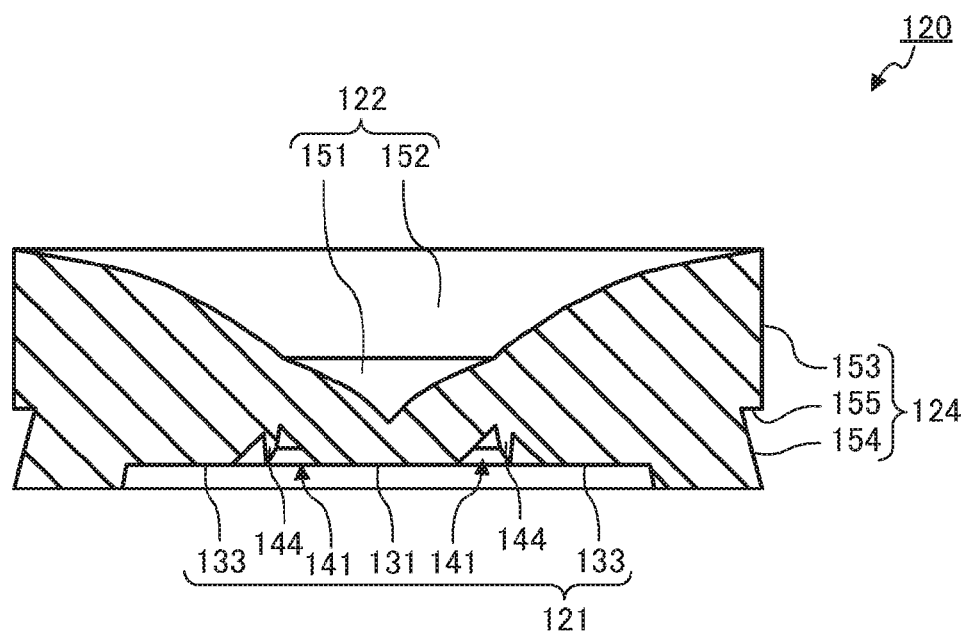
FIG. 5A and FIG. 5B are sectional views of the light flux controlling member according to Embodiment 1.
Figure 5B:
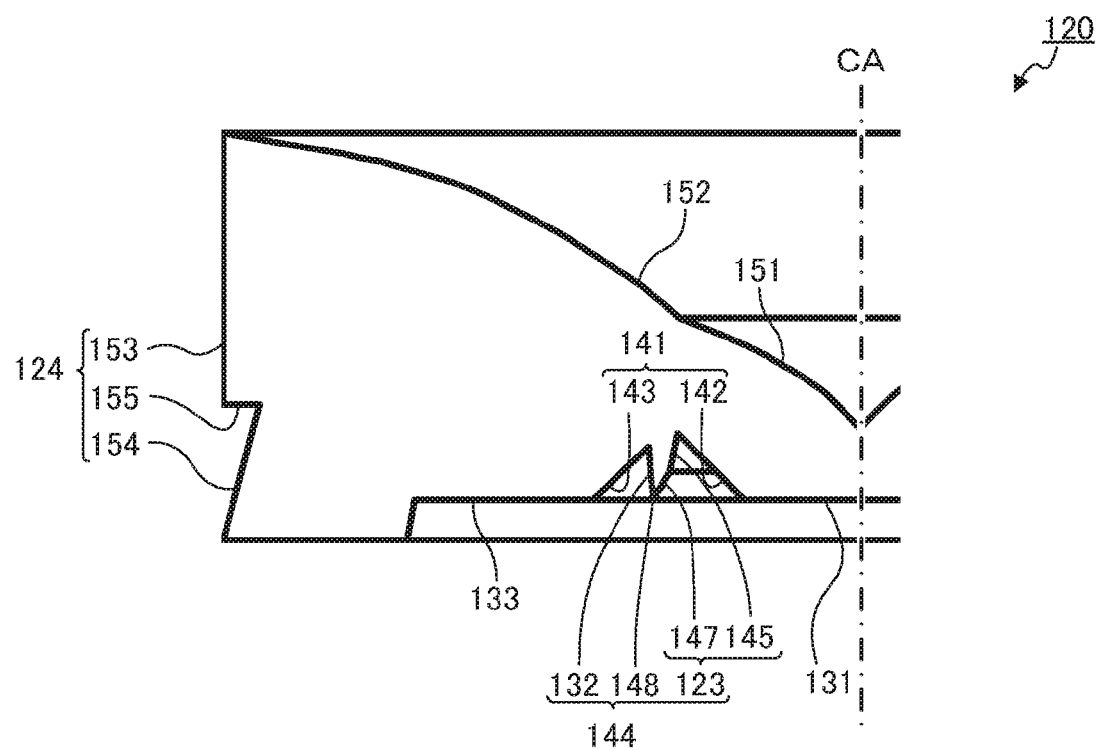

Now light flux controlling member 120 is described in detail. FIG. 3A to FIG. 5B illustrate a configuration of light flux controlling member 120. FIG. 3A is a perspective view of light flux controlling member 120 as viewed from the front side, and FIG. 3B is a perspective view as viewed from the rear side. FIG. 4A is a plan view of light flux controlling member 120, FIG. 4B is a bottom view of light flux controlling member 120, and FIG. 4C is a side view of light flux controlling member 120. FIG. 5A is a sectional view taken along line A-A of FIG. 4A, and FIG. 5B is a partially enlarged view of FIG. 5A. It is to be noted that leg part 125 is omitted in FIG. 3A to FIG. 5B.

As illustrated in FIG. 3A and FIG. 3B, light flux controlling member 120 includes incidence surface 121, upper total reflection surface 122 including first total reflection surface 151 and second total reflection surface 152, lower total reflection surface 123, and emission surface 124. Light flux controlling member 120 is rotationally symmetrical about central axis CA as the rotation axis. In addition, in the present embodiment, light flux controlling member 120 includes a gap for outwardly dissipating the heat emitted from light emitting element 110, and leg part 125 for fixing to housing 170 (see FIG. 2).

Incidence surface 121 allows light emitted from light emitting element 110 to enter light flux controlling member 120. Incidence surface 121 includes third incidence surface 131, first incidence surface 132, and second incidence surface 133. In the present embodiment, incidence surface 121 is at least a part of the inner surface of a recess formed on the rear side of light flux controlling member 120.

Third incidence surface 131 is disposed opposite to light emitting element 110 such that third incidence surface 131 intersects central axis CA (optical axis OA of light emitting element 110). The shape of third incidence surface 131 is not limited. The shape of third incidence surface 131 may be a planar shape, or a curved surface shape. In the present embodiment, third incidence surface 131 has a planar shape. In addition, the shape of third incidence surface 131 is a circular shape in plan view. That is, third incidence surface 131 is rotationally symmetrical about central axis CA as the rotation axis. Third incidence surface 131 allows incidence of a large part of the light emitted from the center portion of light emitting element 110.

First incidence surface 132 is disposed to surround third incidence surface 131. In other words, first incidence surface 132 is disposed separately from central axis CA to surround central axis CA. First incidence surface 132 is rotationally symmetrical about central axis CA as the rotation axis. First incidence surface 132 is a first outer inclined surface in annular protrusion 144 disposed in annular recess 141 surrounding central axis CA. Annular protrusion 144 includes first inner inclined surface 145 and the first outer inclined surface.

Annular recess 141 is disposed to surround third incidence surface 131. Annular recess 141 includes annular second inner inclined surface 142 disposed on central axis CA side (inside), and annular second outer inclined surface 143 disposed on the outer edge side (outside). The depth of annular recess 141 is equal to the height of annular protrusion 144. Preferably, the depth of annular recess 141 is set such that the light which is incident on third incidence surface 131 and is totally reflected by upper total reflection surface 122 does not directly reaches annular recess 141. If the light which is incident on third incidence surface 131, and is totally reflected by upper total reflection surface 122 directly reaches second inner inclined surface 142, the light distribution may not be appropriately controlled.

Second inner inclined surface 142 is rotationally symmetrical about central axis CA as the rotation axis. Second inner inclined surface 142 is formed such that as the distance from central axis CA increases, the distance from the reference plane that is orthogonal to central axis CA and passes through the intersection of third incidence surface 131 and central axis CA increases. The generatrix of second inner inclined surface 142 from central axis CA toward the outer edge may be a straight line or a curved line. In the present embodiment, the generatrix of second inner inclined surface 142 from central axis CA toward the outer edge is a straight line. The inclination angle of second inner inclined surface 142 to central axis CA is not limited, although it is preferable to set the inclination angle in consideration of the light incident on third incidence surface 131. That is, it is preferable to set the inclination angle of second inner inclined surface 142 to central axis CA such that the light which is emitted from light emitting element 110 and is incident on third incidence surface 131 does not directly reach second inner inclined surface 142. If the light incident on third incidence surface 131 directly reaches second inner inclined surface 142, the light distribution may not be appropriately controlled.

Second outer inclined surface 143 is rotationally symmetrical about central axis CA as the rotation axis. Second outer inclined surface 143 is formed such that as the distance from central axis CA increases, the distance to the reference plane decreases. The generatrix of second outer inclined surface 143 from the center side toward the outer edge may be a straight line or a curved line. In the present embodiment, the generatrix of second outer inclined surface 143 from central axis CA toward the outer edge is a straight line. The inclination angle of second outer inclined surface 143 to central axis CA is not limited and is appropriately set. In addition, in the direction orthogonal to optical axis OA in the cross section including optical axis OA, the outer edge of second outer inclined surface 143 is disposed at a position remote from the central axis CA relative to the boundary between first total reflection surface 151 and second total reflection surface 152.

As described above, annular protrusion 144 is disposed inside annular recess 141. Annular protrusion 144 includes annular first inner inclined surface 145 disposed on central axis CA side (inside), and the annular first outer inclined surface disposed on the outer edge side (outside). It is to be noted that first connection surface 147 may be disposed between first inner inclined surface 145 and the first outer inclined surface.

First inner inclined surface 145 is rotationally symmetrical about central axis CA as the rotation axis. First inner inclined surface 145 is connected with the outer edge of second inner inclined surface 142. First inner inclined surface 145 is formed such that as the distance from central axis CA increases, the distance to the reference plane decreases. Preferably, the generatrix of first inner inclined surface 145 from central axis CA toward the outer edge is a straight line. It is to be noted that, as described in detail later, first inner inclined surface 145 functions as a part of lower total reflection surface 123 that reflects the light incident on first outer inclined surface.

The first outer inclined surface (first incidence surface 132) is rotationally symmetrical about central axis CA as the rotation axis. The first outer inclined surface is connected with the inner edge of second outer inclined surface 143. The first outer inclined surface is formed such that as the distance from central axis CA increases, the distance from the reference plane increases. The generatrix of the first outer inclined surface from central axis CA toward the outer edge may be a straight line or a curved line. In the present embodiment, the generatrix of the first outer inclined surface (first incidence surface 132) from central axis CA toward the outer edge is a straight line. In addition, preferably, the inner edge of the first outer inclined surface is flush with third incidence surface 131. In the case where light emitting device 130 includes a plurality of light emitting elements 110, the first outer inclined surface (first incidence surface 132) allows the incidence of the light travelling toward optical axis OA side which is the light emitted from light emitting element 110 disposed at the outer periphery part of protruding part 175. In the case where light emitting element 110 has a large light emitting surface, the first outer inclined surface (first incidence surface 132) allows the incidence of the light travelling toward optical axis OA side which is the light emitted from the outer periphery part of the light emitting surface.

First connection surface 147 connects first inner inclined surface 145 and the first outer inclined surface (first incidence surface 132). Ridgeline 148 is formed at the boundary between first connection surface 147 and the first outer inclined surface. Preferably ridgeline 148 is flush with third incidence surface 131. It is to be noted that in the case where annular protrusion 144 does not include first connection surface 147, the boundary between first inner inclined surface 145 and the first outer inclined surface (first incidence surface 132) is ridgeline 148. In addition, first inner inclined surface 145 and first connection surface 147 form lower total reflection surface 123.

Second incidence surface 133 is disposed to surround first incidence surface 132. The shape of second incidence surface 133 is not limited. The shape of second incidence surface 133 may be a planar shape or a curved surface shape. In the present embodiment, second incidence surface 133 has a planar shape. In addition, the shape of second incidence surface 133 in plan view is an annular shape. In the case where light emitting device 130 includes a plurality of light emitting elements 110, second incidence surface 133 allows the incidence of the other part (the light which does not travel toward first incidence surface 132) of the light emitted from light emitting element 110 disposed at the outer periphery part of protruding part 175. In the case where light emitting element 110 has a large light emitting surface, second incidence surface 133 allows the incidence of the other part (the light which does not travel toward first incidence surface 132) of the light emitted from the outer periphery part of the light emitting surface. That is, second incidence surface 133 is disposed to face the light emitting point of light emitting element 110 at the position most separated from central axis CA. In addition, in the direction of central axis CA, second incidence surface 133 may be disposed at the same position (height) as third incidence surface 131, or may be disposed at a position (height) different from third incidence surface 131. In the present embodiment, in the direction of central axis CA, second incidence surface 133 and third incidence surface 131 are disposed at the same position (height).

Upper total reflection surface 122 is disposed on the side opposite to incidence surface 121 such that the distance from the reference plane increases from central axis CA toward the outer edge. In other words, upper total reflection surface 122 is disposed such that the distance from central axis CA gradually increases along central axis CA toward the upper side. Upper total reflection surface 122 is rotationally symmetrical about central axis CA as the rotation axis. Upper total reflection surface 122 reflects, in a direction away from central axis CA, a part of the light incident on incidence surface 121. In the present embodiment, upper total reflection surface 122 includes first total reflection surface 151 disposed on central axis CA side, and second total reflection surface 152 disposed at the outer edge side.

First total reflection surface 151 is disposed on central axis CA side. First total reflection surface 151 is rotationally symmetrical about central axis CA as the rotation axis. In the present embodiment, first total reflection surface 151 has a rotationally symmetrical aspherical shape. The generatrix of first total reflection surface 151 from central axis CA toward the outer edge is a curve which is formed such that the distance from the reference plane increases from central axis CA toward the outer edge. To be more specific, in the cross section including central axis CA, first total reflection surface 151 is a curve which is curved such that the inclination of the tangent decreases from central axis CA toward the outer edge. The curve may not be an arc unlike the present embodiment, or may be an arc. That is, in the cross section including central axis CA, the curve on one side of central axis CA may be formed with a predetermined first curvature. First total reflection surface 151 reflects toward emission surface 124 a large part (the light whose angle to central axis CA is small) of the light incident on third incidence surface 131.

Second total reflection surface 152 is disposed to surround first total reflection surface 151. Second total reflection surface 152 is rotationally symmetrical about central axis CA as the rotation axis. In the present embodiment, second total reflection surface 152 has a rotationally symmetrical aspherical shape. The generatrix of second total reflection surface 152 from the center toward the outer edge is a curve which is formed such that the distance from the reference plane increases from central axis CA toward the outer edge. To be more specific, in the cross section including central axis CA, second total reflection surface 152 is a curve which is curved such that the inclination of the tangent decreases from central axis CA toward the outer edge. The curve may not be an arc unlike the present embodiment, or may be an arc. That is, in the cross section including central axis CA, the curve on one side of central axis CA may be formed with a second curvature different from the first curvature. In the case where first total reflection surface 151 and second total reflection surface 152 are respectively formed in arcs with predetermined curvatures, first total reflection surface 151 may have a curvature greater than the second curvature, or first total reflection surface 151 and second total reflection surface 152 may be formed with the same curvature by shifting the positions of the curvature centers. In the case where first total reflection surface 151 and second total reflection surface 152 are not arcs, the inclination of the tangent to second total reflection surface 152 at the position closest to central axis CA is greater than the inclination of the tangent to first total reflection surface 151 at the position most separated from central axis CA. Second total reflection surface 152 reflects, toward emission surface 124, the light which is incident on first incidence surface 132 and is reflected by lower total reflection surface 123 described later, and the light which is incident on third incidence surface 131 and does not reach first total reflection surface 151 (the light whose angle to central axis CA is large).

The boundary between first total reflection surface 151 and second total reflection surface 152 is appropriately set. As described above, the light which is mainly incident on first incidence surface 132 and is reflected by lower total reflection surface 123 is reflected by second total reflection surface 152. In view of this, the boundary between first total reflection surface 151 and second total reflection surface 152 in a direction orthogonal to central axis CA is disposed at a location on the outer periphery side relative to lower total reflection surface 123 described later.

As described above, lower total reflection surface 123 includes first inner inclined surface 145. In the present embodiment, lower total reflection surface 123 is composed of first inner inclined surface 145 and first connection surface 147. Lower total reflection surface 123 is disposed between third incidence surface 131 and first incidence surface 132 to surround central axis CA. Lower total reflection surface 123 reflects the light incident on first incidence surface 132 toward second total reflection surface 152. It is to be noted that, in the case where annular protrusion 144 does not include first connection surface 147, first inner inclined surface 145 functions as lower total reflection surface 123. In addition, lower total reflection surface 123 may be formed as a curved surface whose curvature is changed in the direction along central axis CA.

Emission surface 124 is disposed outside upper total reflection surface 122 to surround central axis CA. Emission surface 124 is rotationally symmetrical about central axis CA as the rotation axis. Emission surface 124 emits the light reflected by upper total reflection surface 122 to the outside. Emission surface 124 includes first emission surface 153 and second emission surface 154.

In the direction along central axis CA, first emission surface 153 is disposed on the front side. First emission surface 153 has a cylindrical shape.

In the direction along central axis CA, second emission surface 154 is disposed on the rear side. Second emission surface 154 is formed such that as the distance from central axis CA increases, the distance to the reference plane decreases. The generatrix of second emission surface 154 from central axis CA side toward the outer edge is a straight line.

Step surface 155 is formed between first emission surface 153 and second emission surface 154. Step surface 155 is disposed parallel to third incidence surface 131 (second incidence surface 133). In the direction along central axis CA, the position of step surface 155 in emission surface 124 is not limited. In the present embodiment, the height of step surface 155 is identical to that of first total reflection surface 151 in the direction along central axis CA.

It is to be noted that emission surface 124 may not have step surface 155. In this case, first emission surface 153 and second emission surface 154 are connected with each other.

Figure 6:
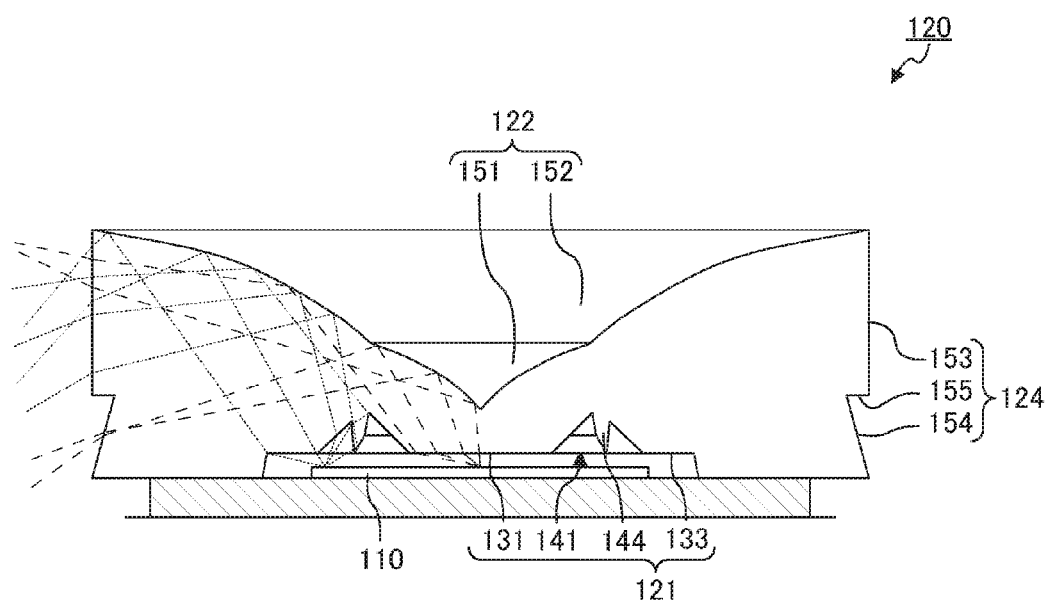
FIG. 6 illustrates light paths in the light flux controlling member according to Embodiment 1.

FIG. 6 illustrates light paths of light emitted from light emitting element 110 in light flux controlling member 120 provided with no leg part 125. In FIG. 6, the broken lines indicate light paths of light emitted from the center of light emitting element 110, and the dotted lines indicate light paths of light emitted from an end portion of light emitting element 110. It is to be noted that, light flux controlling member 120 according to the present embodiment is rotationally symmetrical about central axis CA as the rotation axis, and therefore only light paths of the left half of light flux controlling member 120 in the cross section including central axis CA are illustrated in FIG. 6.

As illustrated in FIG. 5B and FIG. 6, a large part of the light emitted from the center of light emitting element 110 enters light flux controlling member 120 from third incidence surface 131. The light incident on central axis CA side of third incidence surface 131 (the light whose emission angle to optical axis OA is small) advances toward first total reflection surface 151 (upper total reflection surface 122). The light having reached first total reflection surface 151 is totally reflected toward light emission surface 124 (second emission surface 154). In addition, the light which is emitted from the center of light emitting element 110 and is incident on the outer edge of third incidence surface 131 (the light whose emission angle to optical axis OA is large) advances toward second total reflection surface 152 (upper total reflection surface 122). The light having reached second total reflection surface 152 is totally reflected toward emission surface 124 (first emission surface 153). A large part of the light having reached emission surface 124 (first emission surface 153 and second emission surface 154) is emitted toward the rear side of light flux controlling member 120.

In addition, as illustrated in FIG. 5B and FIG. 6, a large part of the light emitted from an end portion of the light emitting surface of light emitting element 110 enters light flux controlling member 120 from light first incidence surface 132 and second incidence surface 133. The light incident on first incidence surface 132 (first outer inclined surface) is totally reflected by lower total reflection surface 123 and then advances toward second total reflection surface 152 (upper total reflection surface 122). The light having reached second total reflection surface 152 is totally reflected toward emission surface 124 (second emission surface 154). In addition, the light which is emitted from an end portion of light emitting element 110 and is incident on second incidence surface 133 advances toward second total reflection surface 152 (upper total reflection surface 122). The light having reached second total reflection surface 152 is totally reflected toward emission surface 124 (first emission surface 153). A large part of the light having reached emission surface 124 (first emission surface 153 and second emission surface 154) is emitted toward the rear side of light flux controlling member 120. It is to be noted that the light emitted from light emitting element 110 is likewise controlled in the case where a plurality of light emitting elements 110 are provided. In this case, the light emitted from light emitting element 110 disposed at the outer periphery part of the front end surface of protruding part 175 corresponds to the light emitted from an end portion of light emitting element 110 in the present embodiment.

(Light Distribution Characteristics of Light Emitting Device and Illumination Apparatus)

Next, to confirm the effect of flux controlling member 120 according to the present embodiment, the light distribution characteristics of light emitting device 130 having one light emitting element 110 and one light flux controlling member 120, and the light distribution characteristics of illumination apparatus 100 in which cover 160 is attached to light emitting device 130 were simulated. To be more specific, in a plane including optical axis OA, relative illuminances in all directions around the light emission center of light emitting element 110 as the reference point were determined. In this simulation, the illuminance in a virtual plane distanced by 1,000 mm from the light emission center of light emitting element 110 was computed. In addition, for comparison, the light distribution characteristics with only light emitting element 110 were also simulated.

Figure 7:
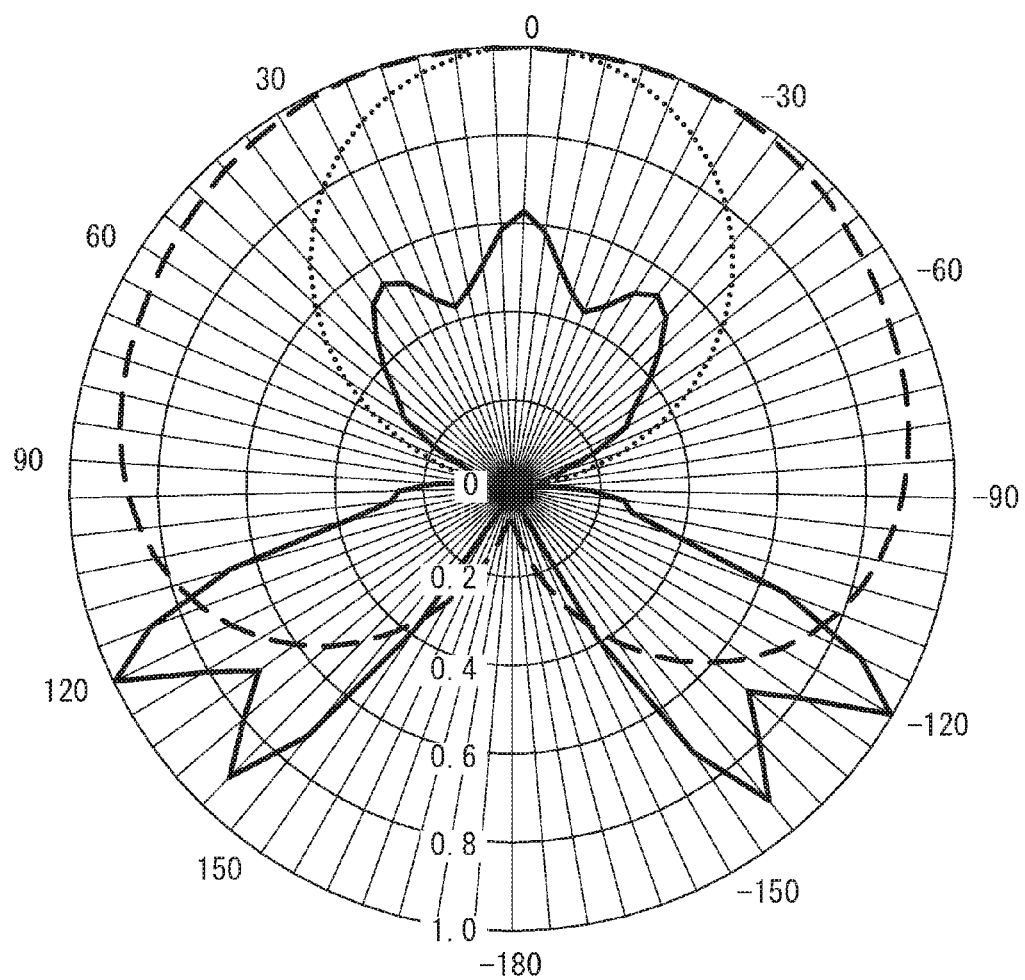
FIG. 7 is a graph illustrating light distribution characteristics of a light emitting element, a light emitting device and an illumination apparatus according to Embodiment 1.

FIG. 7 is a graph illustrating light distribution characteristics of light emitting element 110, light emitting device 130 and illumination apparatus 100. The numerical values shown on the outside of the graph represent angles)(° relative to the light emission center of light emitting element 110. 0° represents the light axis direction (forward direction), 90° the horizontal direction (lateral direction), and 180° the rearward direction. In addition, the numerical values shown on the inside of the graph represent the relative illuminances (maximum value: 1) of respective directions. In the graph, the dotted line indicates the result of the case when only light emitting element 110 is used, and the solid line indicates the result of the case where light emitting element 110 and light flux controlling member 120 are combined (light emitting device 130), and the broken line indicates the result of the case where light emitting element 110, light flux controlling member 120, and cover 160 are combined (illumination apparatus 100).

As illustrated in FIG. 7, it was confirmed that, in the case of light emitting device 130, the light travelling in the direction of ±120 to 150° was appropriately generated in addition to the light travelling forward. One possible reason for this that the light emitted from an end portion of light emitting element 110 was appropriately controlled toward the rear side with lower total reflection surface 123. In addition, it was confirmed that, in the case of illumination apparatus 100 in which cover 160 is attached to light emitting device 130, unevenness of the light can be reduced by equalizing the quantity of the emitted light in the forward direction, the lateral direction and the rearward direction.

(Effect)

As described above, illumination apparatus 100 including light flux controlling member 120 according to Embodiment 1 of the present invention includes lower total reflection surface 123 for controlling the light emitted from the outer periphery part of light emitting element 110, and thus can appropriately control not only the light emitted from the center of light emitting element 110, but also the light emitted from the outer periphery part of light emitting element 110. Accordingly, illumination apparatus 100 according to the present invention can provide light distribution characteristics close to incandescent lamps in comparison with the conventional illumination apparatuses. It is to be noted that also illumination apparatus 100 including a plurality of light emitting elements 110 has a similar effect.

Embodiment 2

Illumination apparatus 200 according to Embodiment 2 is different from illumination apparatus 100 according to Embodiment 1 in the configuration of light emitting device 230. In view of this, the configurations similar to those of Embodiment 1 are denoted with the same reference numerals, and the description thereof will be omitted.

(Configuration of Illumination Apparatus)

Figure 8A:
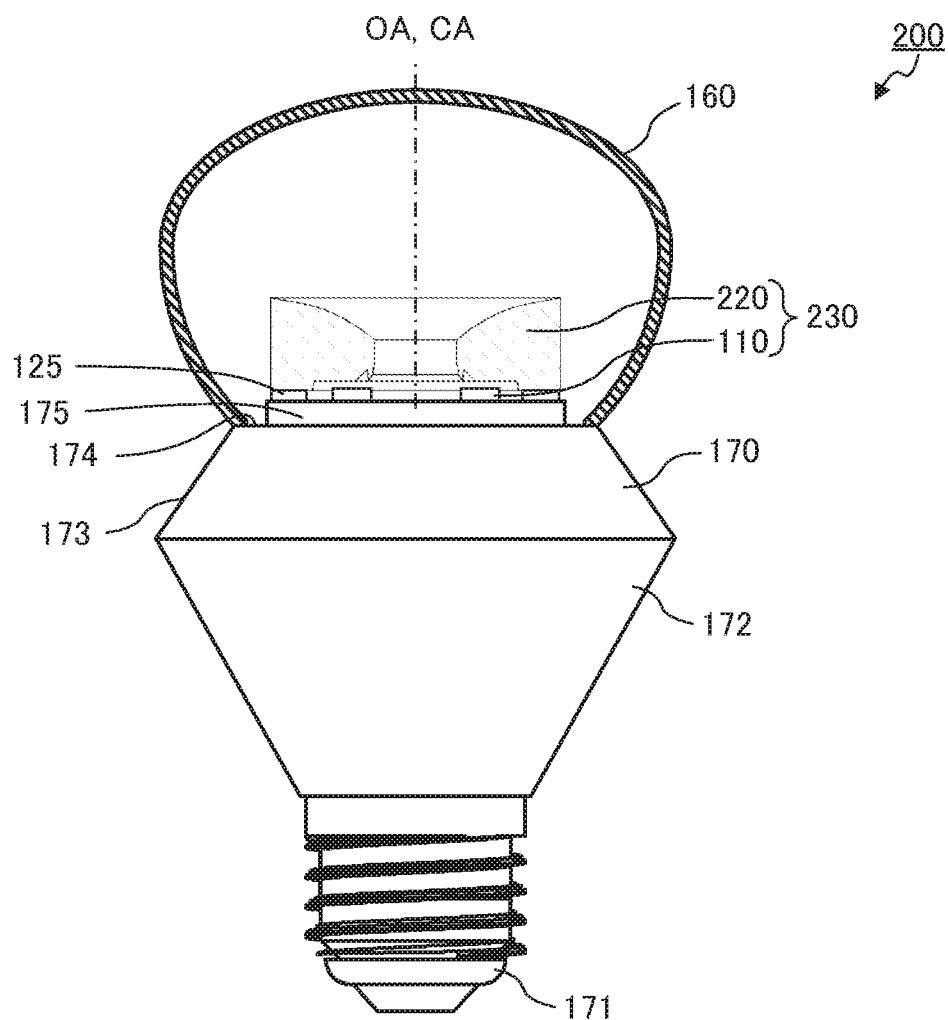
FIG. 8A is a partial sectional view of an illumination apparatus according to Embodiment 2.
Figure 8B:
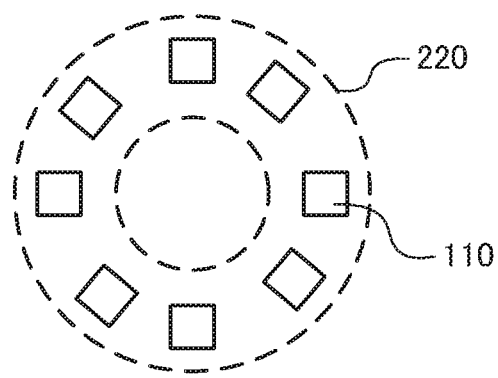
FIG. 8B illustrates positions of light emitting elements in the illumination apparatus according to Embodiment 2.

FIG. 8A is a sectional view illustrating a configuration of illumination apparatus 200 according to Embodiment 2 of the present invention, and FIG. 8B is a plan view illustrating the positions of light emitting elements 110 in illumination apparatus 200 according to Embodiment 2. It is to be noted that, in FIG. 8A, only light emitting device 230 and cover 160 are illustrated in cross-section. As illustrated in FIG. 8A, illumination apparatus 200 includes light emitting device 230 including light emitting element 110 and light flux controlling member 220, cover 160, and housing 170.

Light emitting elements 110 are mounted on a substrate (not illustrated) attached to housing 170. The number of light emitting elements 110 is not limited as long as a plurality of light emitting elements 110 are provided. In the present embodiment, eight light emitting elements 110 are disposed in the circumferential direction at even intervals. Optical axis OA of each light emitting element 110 is set to intersect light flux controlling member 220. In addition, the light emitting surface of each light emitting element 110 faces second incidence surface 133.

(Configuration of Light Flux Controlling Member)

Figure 9A:
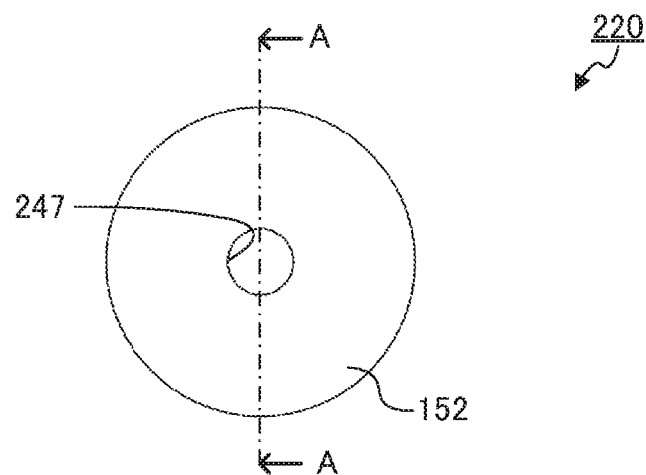
FIG. 9A to FIG. 9C illustrate a configuration of a light flux controlling member according to Embodiment 2.
Figure 9B:
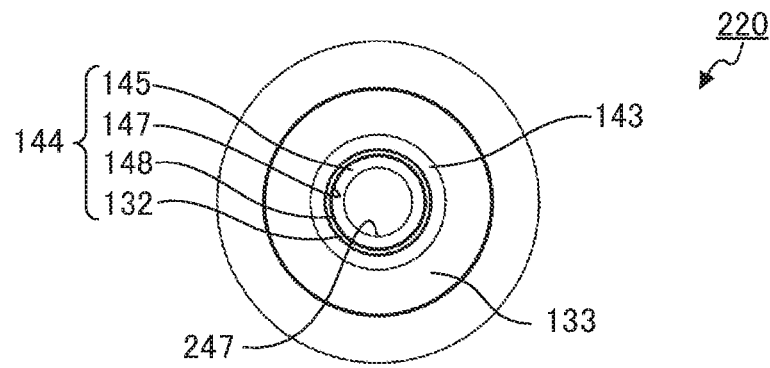
Figure 9C:
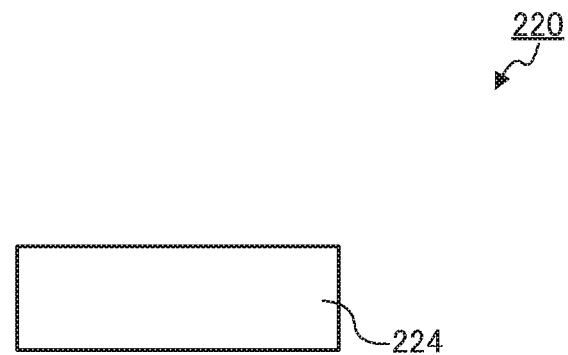
Figure 10:
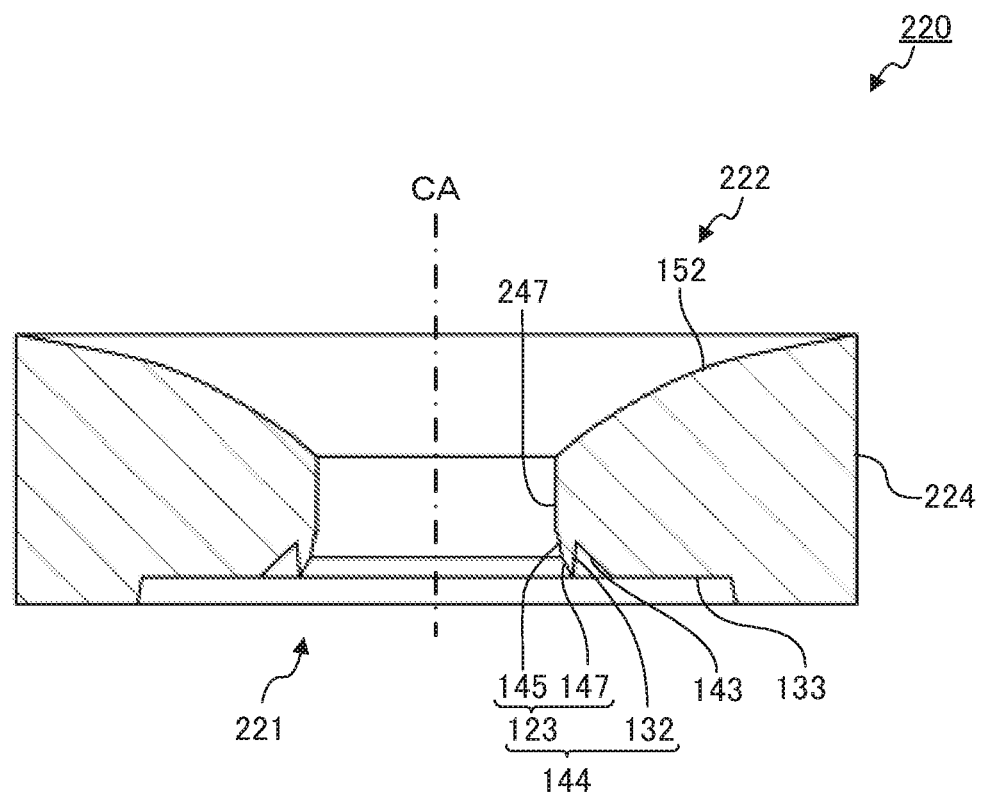
FIG. 10 is a sectional view of the light flux controlling member according to Embodiment 2.

FIG. 9A to FIG. 9C and FIG. 10 illustrate a configuration of light flux controlling member 220. FIG. 9A is a plan view of light flux controlling member 220, FIG. 9B is a bottom view of light flux controlling member 220, and FIG. 9C is a side view of light flux controlling member 220. FIG. 10 is a sectional view taken along line A-A of FIG. 9A. It is to be noted that, in FIG. 9A to FIG. 9C and FIG. 10, leg part 125 is omitted.

As illustrated in FIG. 9A to FIG. 9C and FIG. 10, light flux controlling member 220 includes incidence surface 221, upper total reflection surface 222 including second total reflection surface 152, lower total reflection surface 123, and emission surface 224. In addition, in the present embodiment, light flux controlling member 220 includes leg part 125. Incidence surface 221 includes first incidence surface 132, and second incidence surface 133.

First incidence surface 132 is a first outer inclined surface in annular protrusion 144 including first inner inclined surface 145, first connection surface 147, ridgeline 148 and the first outer inclined surface. In addition, annular second outer inclined surface 143 is disposed outside first incidence surface 132. Second total reflection surface 152 (upper total reflection surface 222) is formed such that the distance from central axis CA gradually increases toward the upper side (the emission direction of light emitted from light emitting element 110) along central axis CA.

Emission surface 224 is rotationally symmetrical about central axis CA as the rotation axis, and is formed in a cylindrical shape. It is to be noted that emission surface 224 may be composed of a plurality of surfaces.

As described above, in the present embodiment, light flux controlling member 220 includes a through hole at its center, and does not include third incidence surface 131 or first total reflection surface 151. Further, an end portion of upper total reflection surface 222 (second total reflection surface 152) on central axis CA side, and an end portion of incidence surface 221 (first inner inclined surface 145) on central axis CA side are connected with each other with second connection surface 247.

The functions and shapes of second incidence surface 133, annular protrusion 144 including first inner inclined surface 145, first connection surface 147, ridgeline 148 and the first outer inclined surface, and second outer inclined surface 143 are similar to those of Embodiment 1, and therefore the description thereof is omitted.

Figure 11A:
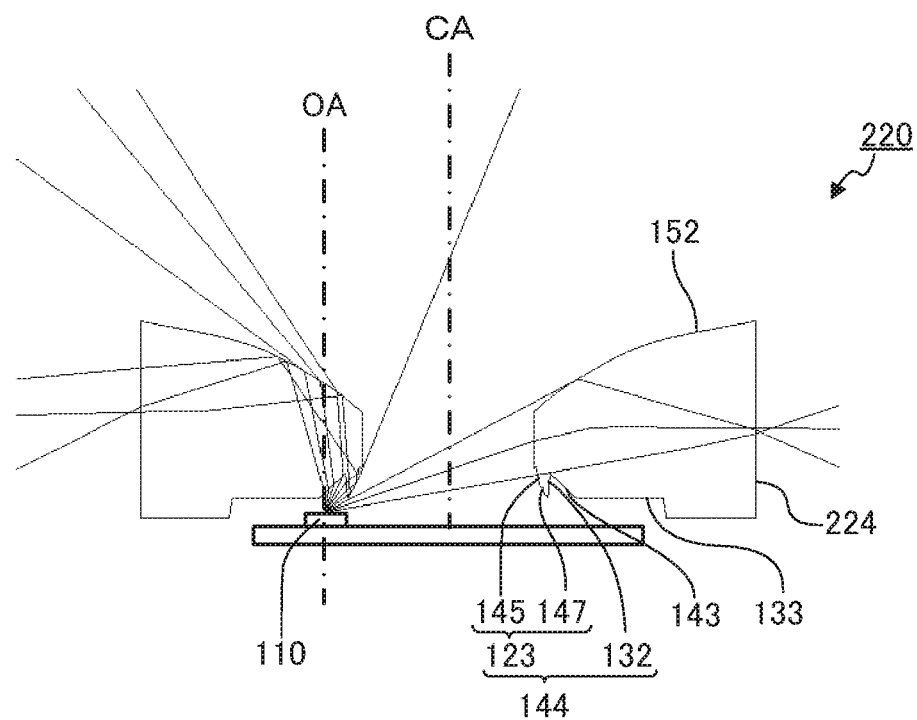
FIG. 11A and FIG. 11B illustrate light paths in the light flux controlling member according to Embodiment 2.
Figure 11B:
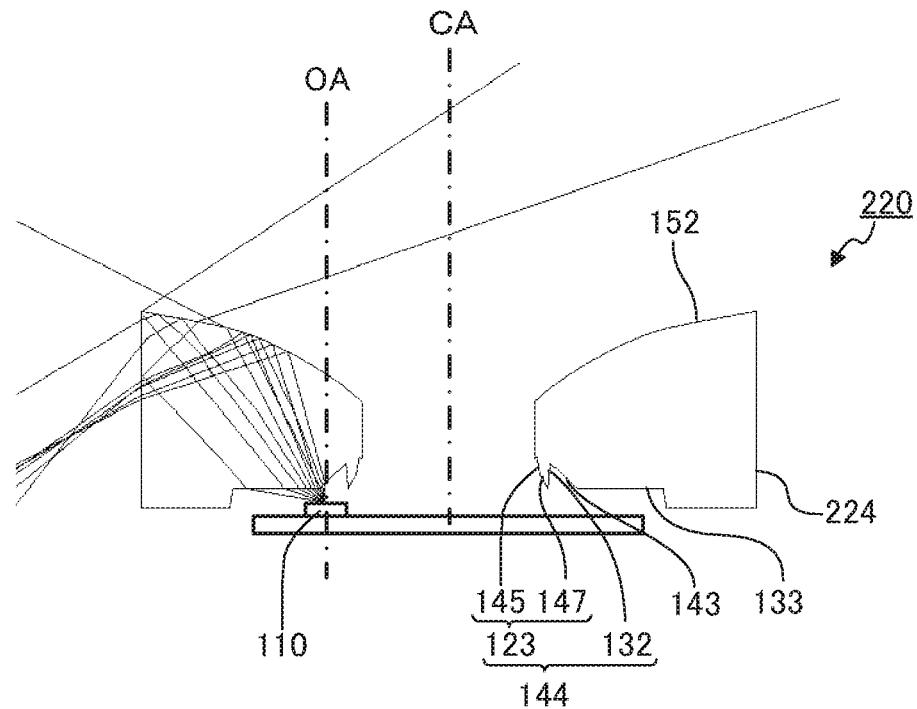

FIG. 11A and FIG. 11B illustrate light paths of the light emitted from light emitting element 110 in light flux controlling member 220. FIG. 11A illustrates light paths of the light which is emitted from light emitting element 110 toward central axis CA side relative to optical axis OA of light emitting element 110, and FIG. 11B illustrates light paths of the light which is emitted from light emitting element 110 toward the outer edge side relative to optical axis OA of light emitting element 110. It is to be noted that light flux controlling member 220 according to the present embodiment is rotationally symmetrical about central axis CA as the rotation axis, and therefore FIG. 11A and FIG. 11B illustrate only light paths in the left half of light flux controlling member 220 in the cross section including central axis CA. In addition, in FIG. 11A and FIG. 11B, leg part 125 is omitted.

As illustrated in FIG. 11A, in the light which is emitted from light emitting element 110 toward central axis CA side relative to optical axis OA of light emitting element 110, the light whose emission angle is small enters light flux controlling member 220 from first incidence surface 132. The incident light from first incidence surface 132 (first outer inclined surface) is totally reflected by lower total reflection surface 123 and then advances toward second total reflection surface 152 (upper total reflection surface 122). The light having reached second total reflection surface 152 is totally reflected toward emission surface 224. The light totally reflected by second total reflection surface 152 is emitted toward the lateral side or the rear side of light flux controlling member 220. In addition, in the light which is emitted from light emitting element 110 toward central axis CA side relative to optical axis OA of light emitting element 110, the light whose emission angle is large is incident on a portion located on the opposite side with respect to light central axis CA, and is emitted toward the lateral side or the rear side of light flux controlling member 220. It is to be noted that, a part of the light which is emitted from light emitting element 110 toward central axis CA side relative to optical axis OA of light emitting element 110 is incident on second outer inclined surface 143, and emitted to the outside of second total reflection surface 152.

As illustrated in FIG. 11B, a large part the light which is emitted from light emitting element 110 toward the outer edge side relative to optical axis OA of light emitting element 110 enters light flux controlling member 220 from second incidence surface 133 or second outer inclined surface 143. A large part of the light incident on second incidence surface 133 or second outer inclined surface 143 is totally reflected by second total reflection surface 152 toward light emission surface 124 (second emission surface 154). The light totally reflected by second total reflection surface 152 is emitted toward the lateral side or the rear side of light flux controlling member 220.

(Effect)

As described above, illumination apparatus 200 including light flux controlling member 220 according to Embodiment 2 of the present invention includes lower total reflection surface 123, and therefore can appropriately control the light emitted from light emitting element 110 even in the case where light emitting elements 110 are disposed in the circumferential direction. Accordingly, in comparison with conventional illumination apparatus, illumination apparatus 200 according to the present invention can provide light distribution characteristics close to incandescent lamps.

This application is entitled to and claims the benefit of Japanese Patent Application No. 2015-095643 filed on May 8, 2015, and Japanese Patent Application No. 2015-216880 filed on Nov. 4, 2015 the disclosure each of which including the specification, drawings and abstract is incorporated herein by reference in its entirety.

INDUSTRIAL APPLICABILITY

The illumination apparatus of the embodiments of the present invention can be used in place of incandescent lamps, and therefore can be widely applied to various kinds of illumination apparatuses such as chandeliers and indirect lighting apparatuses.

REFERENCE SIGNS LIST

10 Illumination apparatus
12 LED
14 Case
16 Aluminum plate
18 Transmission window
100, 200 Illumination apparatus
110 Light emitting element
120, 220 Light flux controlling member
121, 221 Incidence surface
122, 222 Upper total reflection surface
123 Lower total reflection surface
124, 224 Emission surface
125 Leg part
130, 230 Light emitting device
131 Third incidence surface
132 First incidence surface (first outer inclined surface)
133 Second incidence surface
141 Annular recess
142 Second inner inclined surface
143 Second outer inclined surface
144 Annular protrusion
145 First inner inclined surface
147 First connection surface
148 Ridgeline
151 First total reflection surface
152 Second total reflection surface
153 First emission surface
154 Second emission surface
155 Step surface
160 Cover
170 Housing
171 Base
172 First tapered surface
173 Second tapered surface 174 Annular end surface
175 Protruding part
247 Second connection surface

The invention claimed is:

1. A light flux controlling member that controls a distribution of light emitted from a light emitting element, the light flux controlling member comprising:
an incidence surface including a first incidence surface that is disposed separately from a central axis of the light flux controlling member to surround the central axis, and a second incidence surface that is disposed to surround the first incidence surface, the incidence surface being configured to allow light emitted from the light emitting element to enter the light flux controlling member;
an upper total reflection surface disposed on a side opposite to the incidence surface such that a distance from the central axis gradually increases along the central axis toward an upper side, the upper total reflection surface being configured to reflect, in a direction away from the central axis, a part of light incident on the incidence surface;
a lower total reflection surface disposed between the central axis and the first incidence surface to surround the central axis, and configured to reflect, toward the upper total reflection surface, a part of light incident on the first incidence surface; and
an emission surface disposed outside relative to the upper total reflection surface to surround the central axis, and configured to mainly emit, to outside, light reflected by the upper total reflection surface,
wherein the incidence surface, the upper total reflection surface, the lower total reflection surface and the emission surface are rotationally symmetrical about the central axis as a rotation axis,
wherein the incidence surface further includes a third incidence surface disposed to intersect the central axis,
wherein the upper total reflection surface is disposed to intersect the central axis, and
wherein the lower total reflection surface is disposed between the first incidence surface and the third incidence surface.

2. The light flux controlling member according to claim 1, wherein:
in a cross section including the central axis, the upper total reflection surface includes a first total reflection surface that is a curve disposed on the central axis side, and a second total reflection surface that is a curve disposed outside the first total reflection surface and connected with the first total reflection surface;
in the cross section including the central axis, the first total reflection surface and the second total reflection surface are formed such that an inclination of a tangent gradually decreases from the central axis toward an outer edge;
an inclination of a tangent to the second total reflection surface at a position closest to the central axis is greater than an inclination of a tangent to the first total reflection surface at a position most separated from the central axis;
the first incidence surface is a first outer inclined surface in an annular protrusion disposed in an annular recess surrounding the central axis, the annular protrusion including a first inner inclined surface and the first outer inclined surface; and
the lower total reflection surface includes the first inner inclined surface, and reflects a part of light incident on the first incidence surface toward the second total reflection surface.

3. The light flux controlling member according to claim 2, wherein:
the annular recess includes a second inner inclined surface and a second outer inclined surface;
in a direction along the central axis, the lower total reflection surface is disposed at a position where light which is incident on the third incidence surface and is totally reflected by the first total reflection surface does not directly reach the lower total reflection surface;
the second inner inclined surface is disposed at an angle at which light incident on the third incidence surface does not directly reach the second inner inclined surface; and
an outer edge of the second outer inclined surface is disposed at a position remote from the central axis relative to a boundary between the first total reflection surface and the second total reflection surface in a direction orthogonal to the central axis in a cross section including the central axis.

4. The light flux controlling member according to claim 1, wherein each of the second incidence surface and the third incidence surface is a plane perpendicular to the central axis.

5. A light emitting device comprising:
one or more light emitting elements; and
the light flux controlling member according to claim 1,
wherein the light flux controlling member is disposed such that a central axis of the light flux controlling member coincides with an optical axis of the one or more light emitting elements, and
wherein a light emitting surface of the one or more light emitting elements is disposed to face the second incidence surface at a position most separated from the central axis.

6. An illumination apparatus comprising:
the light emitting device according to claim 5; and
a cover hat that allows light emitted from the light emitting device to pass therethrough while diffusing the light.

* * * * *